US012566495B2

(12) United States Patent (10) Patent No.: US 12,566,495 B2
Huang et al. (45) Date of Patent: Mar. 3, 2026

(54) IMAGE ANALYSIS USING GAZE TRACKING AND UTTERANCE DICTATION

(71) Applicants:Intuitive Research and Technology Corporation, Huntsville, AL (US); The UAB Research Foundation, Birmingham, AL (US)

(72) Inventors: Junjian Huang, Birmingham, AL (US); Chanler Megan Crowe Cantor, Madison, AL (US); Steven Michael Thomas, Madison, AL (US)

(73) Assignees: Intuitive Research and Technology Corporation, Huntsville, AL (US); The UAB Research Foundation, Birmingham, AL (US)

( * ) Notice: Subject to any disclaimer, the term of this patent is extended or adjusted under 35 U.S.C. 154(b) by 194 days.

(21) Appl. No.: 18/511,872

(22) Filed: Nov. 16, 2023

(65) Prior Publication Data

US 2024/0168549 A1 May 23, 2024

Related U.S. Application Data

(60) Provisional application No. 63/427,388, filed on Nov. 22, 2022.

(51) Int. Cl.
*G06F 3/01* (2006.01)
*G06F 40/205* (2020.01)
*G06V 20/70* (2022.01)
*G10L 15/26* (2006.01)

(52) U.S. Cl.
CPC ............ *G06F 3/013* (2013.01); *G06F 40/205* (2020.01); *G06V 20/70* (2022.01); *G10L 15/26* (2013.01)

(58) Field of Classification Search
None
See application file for complete search history.

(56) References Cited

U.S. PATENT DOCUMENTS

| | | | | |
|---|---|---|---|---|
| 7,203,649 | B1 * | 4/2007 | Linebarger | .............. G10L 15/18 |
| | | | | 704/271 |
| 2007/0078642 | A1 * | 4/2007 | Weng | ....................... G10L 15/19 |
| | | | | 704/4 |
| 2017/0262051 | A1 * | 9/2017 | Tall | ......................... G06F 3/167 |
| 2017/0286398 | A1 * | 10/2017 | Hunt | ....................... G06F 40/30 |
| 2019/0362557 | A1 * | 11/2019 | Lacey | ....................... G06T 7/70 |
| 2020/0128231 | A1 * | 4/2020 | Pace | .................... H04N 13/383 |
| 2020/0400957 | A1 * | 12/2020 | Van Heugten | ..... G02B 27/0172 |
| 2021/0034702 | A1 * | 2/2021 | Sizemore | .............. G06F 40/242 |
| 2022/0092754 | A1 * | 3/2022 | Hakim | ................. H04N 13/156 |
| 2024/0169494 | A1 * | 5/2024 | Strandborg | ............. G06T 15/20 |

* cited by examiner

*Primary Examiner* — Talha M Nawaz
(74) *Attorney, Agent, or Firm* — Workman Nydegger

(57) ABSTRACT

Techniques for evaluating images are disclosed. An image is displayed. Data corresponding to a gaze fixation of a user who is viewing the image is obtained. An image artifact is identified based on the gaze fixation. The image artifact is at a location in the image where the gaze fixation occurred. A recording of the user's utterance is accessed. This recording is recorded during an overlapping time period with when the gaze fixation occurred. The recording is transcribed into text, which is then parsed. A key term is extracted from the parsed text. A determination is made as to whether the key term corresponds to the image artifact identified based on the gaze fixation.

20 Claims, 11 Drawing Sheets

Individual Training Phase
200

Image
210

Student Gaze
220

Utterance
225

Highlighted Artifact
215

Pre-Programmed
205

Tracer Overlay
(Saccade)
305

Highlighted
Artifact
300

Current Gaze Location
415

Tracer Overlay
410

Model Path To Follow
405

Highlighted
Artifact
400

Figure 5:
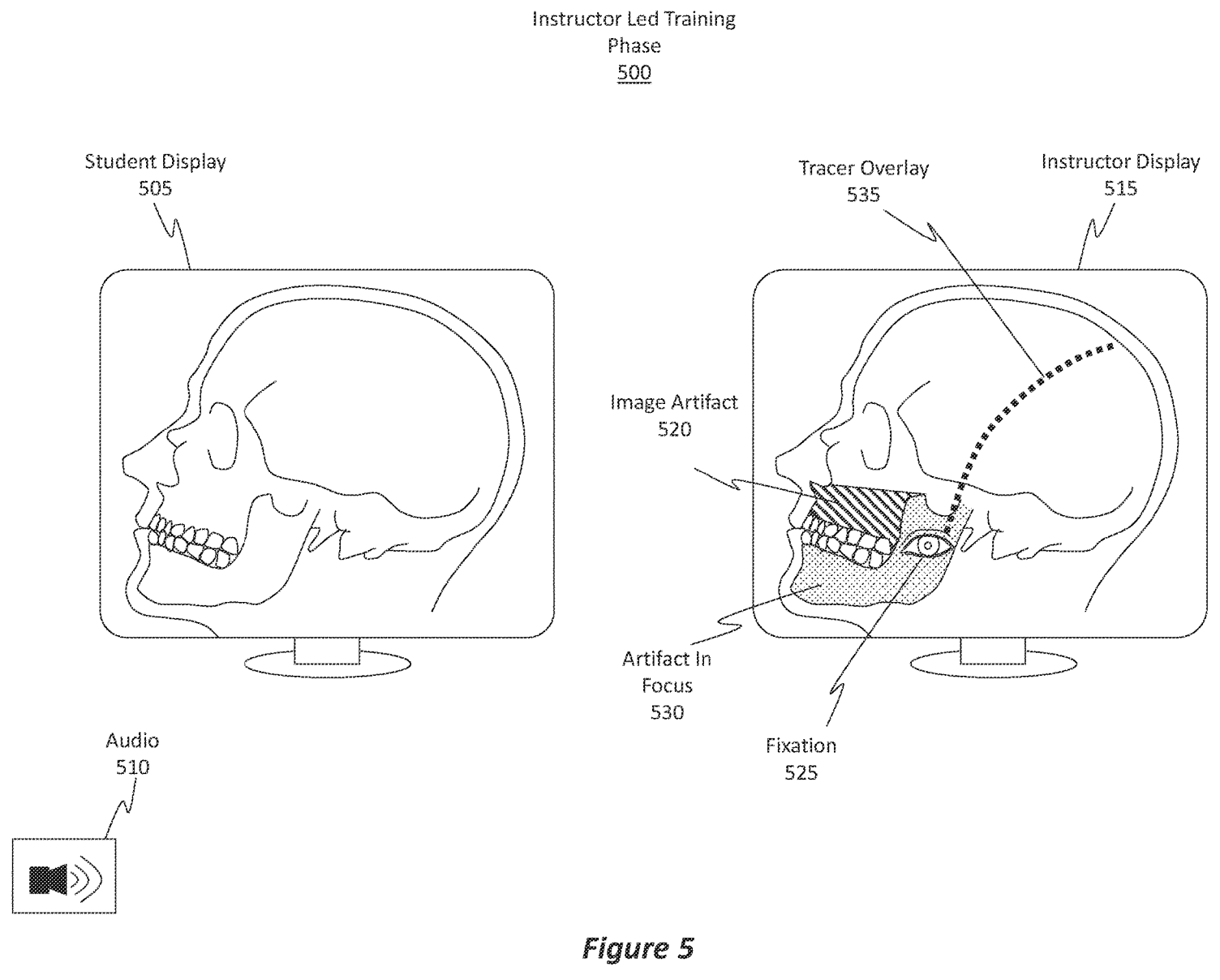

Instructor Led Training Phase
500

Instructor Display
515

Tracer Overlay
535

Image Artifact
520

Artifact In
Focus
530

Fixation
525

Student Display
505

Audio
510

Model Gaze Path
905

Student's Gaze Path
900

IMAGE ANALYSIS USING GAZE TRACKING AND UTTERANCE DICTATION

CROSS-REFERENCE TO RELATED APPLICATIONS

This application claims the benefit of and priority to U.S. Provisional Patent Application Ser. No. 63/427,388 filed on Nov. 22, 2022 and entitled "IMAGE ANALYSIS USING GAZE TRACKING AND UTTERANCE DICTATION," and which application is expressly incorporated herein by reference in its entirety.

BACKGROUND

Over the past few years, eye tracking technology (aka gaze tracking) has significantly improved. Currently, eye tracking is used in a plethora of different applications and scenarios. For instance, eye tracking is often used in gaming, virtual or augmented reality scenarios, and even screen interaction. At a high level, an eye tracker generally tracks the movements of a user's pupil in an attempt to determine where the user is looking. While eye tracking has provided significant benefits to many diverse technical fields, there are other fields that can be benefitted by incorporating the use of eye tracking.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for facilitating an evaluation of an image by comparing an identified image artifact included in the image against a gaze fixation that is directed toward the image artifact and against an utterance that is also associated with the image artifact, said method including: displaying an image; while the image is displayed, tracking a gaze of a user who is viewing the image, wherein tracking the gaze includes identifying a gaze fixation of the user with respect to the image; identifying, from within the image, an image artifact that is represented within the image at a location in the image where the gaze fixation occurred; while the image is displayed, recording an utterance of the user, said utterance being recorded during an overlapping time period with when the gaze fixation occurred; transcribing the recorded utterance into text; in response to parsing the text, extracting at least one key term from the parsed text; and determining whether at least one key term accurately describes the image artifact where the gaze fixation occurred relative to the image.

In some aspects, the techniques described herein relate to a computer system including: one or more processors; and one or more hardware storage devices that store instructions that are executable by the one or more processors to cause the computer system to: display an image; while the image is displayed, track a gaze of a user who is viewing the image, wherein tracking the gaze includes identifying a gaze fixation of the user with respect to the image; based on the gaze fixation, identify, from within the image, an image artifact that is represented within the image at a location in the image where the gaze fixation occurred; while the image is displayed, record an utterance of the user, said utterance being recorded during an overlapping time period with when the gaze fixation occurred; transcribe the recorded utterance into text; in response to parsing the text, extract a key term from the parsed text; and determine whether the key term corresponds to the image artifact, which is identified based on the gaze fixation.

In some aspects, the techniques described herein relate to a method including: displaying an image; obtaining data corresponding to a gaze fixation of a user who is viewing the image; based on the gaze fixation, identifying an image artifact that is represented within the image and that is at a location in the image where the gaze fixation occurred; accessing a recording of an utterance of the user, said recording being recorded during an overlapping time period with when the gaze fixation occurred; transcribing the recording into text; in response to parsing the text, extracting a key term from the parsed text; and determining whether the key term corresponds to the image artifact identified based on the gaze fixation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates an instructor led training scenario where the instructor is provided a visualization that tracks the student's gaze when analyzing images.

FIG. 6 illustrates another instructor led training scenario.

DETAILED DESCRIPTION

Figure 1:
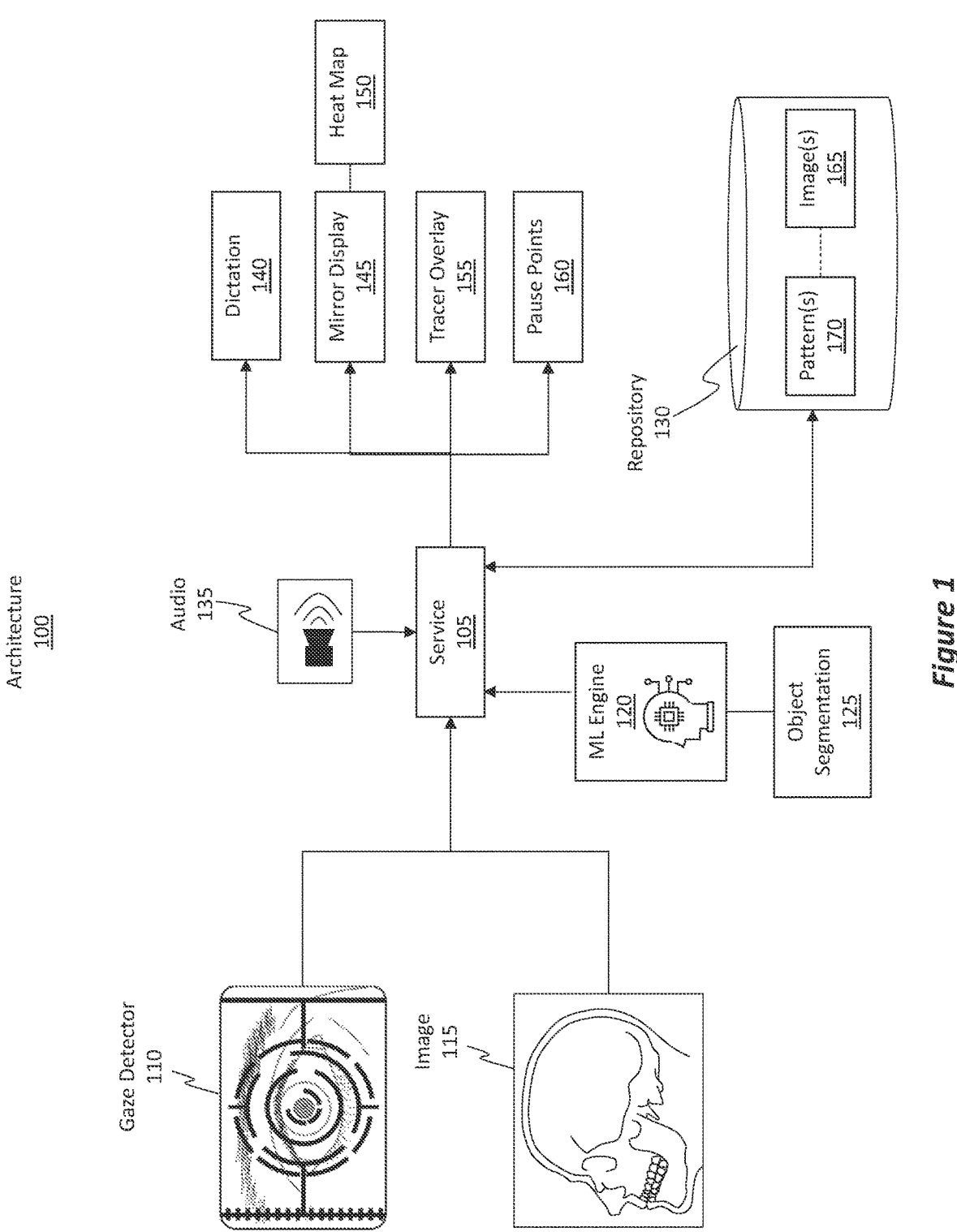
FIG. 1 illustrates an example architecture for performing image analysis using gaze detection/tracking and utterance dictation.

Embodiments disclosed herein relate to systems, devices, and methods for facilitating an evaluation of an image by comparing an identified image artifact included in the image against a gaze fixation that is directed toward the image artifact and against an utterance that is also associated with the image artifact. As used herein, a typical user of the system can also be referred to as a "student" or "trainee." Those terms can be interchanged with one another. The terms "trainer" and "instructor" can be interchanged with one another and generally refer to a person who is providing guidance to a trainee.

To achieve the above objectives, some embodiments display an image. While the image is displayed, the embodiments track the gaze of a user who is viewing the image. The process of tracking the gaze includes identifying a gaze fixation of the user with respect to the image. The embodiments identify, from within the image, an image artifact. As used herein, the term "artifact" refers to one or more pixels in an image, where those pixels represent specific content. One will appreciate how the content can be any type of content, without limit. As an example, a set of pixels might represent a femur bone in an x-ray. The collection of those pixels constitute an image artifact. Any distinguishable set of pixels can be classified as being an artifact.

This artifact is represented within the image at least at the location in the image where the gaze fixation occurred. While the image is displayed, the embodiments also record an utterance of the user. As used herein, the term "utterance" refers to audible speech expressed by a user.

This utterance is recorded during an overlapping time period with when the gaze fixation occurred. Stated differently, the user audibly described the artifact while the user was looking at the artifact.

The recorded utterance is transcribed into text. That text is then parsed. In response to parsing the text, the embodiments extract at least one key term from the parsed text. The key term is a term that is recognized as potentially being associated with the artifact. The embodiments then determine whether the key term accurately describes the image artifact where the fixation occurred relative to the image. In other words, the key term was identified as potentially being linked or associated with the artifact, and the embodiments are able to confirm or reject whether the key term actually is related to the artifact.

The disclosed principles can be used in a variety of contexts or scenarios. As non-limiting examples only, the principles can be used in any type of medical field, such as radiology, anesthesiology, dental, vision, and so on. The principles can also be employed outside of the medical field, such as in any type of science, technology, engineering, or math field. The principles can be employed in non-STEM related fields as well. Generally, the principles are practiced in a learning scenario or environment. As such, the principles can be employed in any type of learning environment, including schools, colleges, universities, trade schools, professional schools, and so on. As will be discussed momentarily, the disclosed principles significantly improve the learning dynamic of students and help to bring novices up to a competent level in a quick and efficient manner.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments significantly improve how students learn and how those students are trained or instructed. As an example, consider the traditional techniques for training a radiology student on how to read and analyze a radiology image. Historically, such students often needed to review hundreds or thousands of images before their understanding even began to germinate into a baseline understanding of what they were seeing in the images. In effect, the training was a "trial by fire" process.

The disclosed embodiments provide an improved training process by offering an enhanced guiding regimen for training students/users/trainees on how to analyze and interpret artifacts embedded in or included in an image. Any type of artifact can be analyzed.

Using the radiology example, an artifact can optionally be a particular anatomical feature in an x-ray or perhaps a tissue mass in a scan. The embodiments are structured to facilitate training a user to recognize artifacts of potential interest in an image. For instance, it is beneficial for a medical professional to be able to quickly and efficiently identify a tumor in a scan. Furthermore, the embodiments are structured to gauge the level of the student's understanding by comparing and contrasting both verbal cues (or "utterances") spoken by the user as well as the user's visual understanding, as determined by that user's gaze fixation.

By combining the display of a visual image with (i) the tracking of the user's gaze with regard to that image and (ii) the analysis of the user's utterances with regard to that image, the disclosed embodiments are able to provide a heightened technique for training a student and for evaluating a student's level of competency in terms of analyzing and recognizing artifacts in an image. Additionally, the embodiments are better able to determine a student's level of competency by effectively preventing a student from being able to hide his/her competency level from an instructor (e.g., avoid a "fake it till you make it" scenario). The embodiments are able to quickly and accurately determine a student's competency and then adjust the training process based on the student's actual ability levels. In effect, the embodiments advantageously remove the "guesswork" on the part of the instructor, which guesswork has been inherent to traditional training regimes (e.g., an instructor no longer has to guess the student's proficiency level).

By practicing the disclosed principles, trainees can train with confidence and can be provided with more focused training tailored to their individual needs. The training process will also be made more efficient and faster, thereby enabling a trainee to readily transition from a novice to one having at least a competent level. Accordingly, these and numerous other benefits will now be discussed in more detail throughout the remaining portions of this disclosure.

Example Architecture

Having just described some of the high level benefits of the disclosed embodiments, attention will now be directed to FIG. 1, which illustrates an example architecture 100 that can be used to achieve those benefits. Architecture 100 is shown as including a service 105. Service 105 can be any type of service. In some implementations, service 105 is a local service operating on a local client device or a local computing device. In some implementations, service 105 is a cloud computing service that is available for use over a network connection. In some cases, service 105 can be a hybrid combination, such as by having a client portion on a local device and a master portion in the cloud. As used herein, the term "service" generally refers to an on-demand data storage and/or data processing application that is tasked with performing any number of different operations. Service 105 is configured to be able to perform gaze detection and analysis, image analysis, and audio analysis. Of course, service 105 can be configured to perform additional operations as well.

Service 105 is shown as interacting with or perhaps including a gaze detector 110. As used herein, gaze detector 110 refers to a device that is able to locate and track where a user is looking. Typically, in the context of architecture 100, the user will be looking at and analyzing an image that is displayed on a computer screen. Thus, gaze detector 110 can determine where the user is looking relative to a position on the screen. It should be noted that the gaze detector 110 can provide a real-time determination of where a person is focusing his/her attention based on the focal orientation of the user's eyes. The gaze detector 110 can perform a number of additional operations as well.

For instance, the gaze detector 110 can perform face detection to identify a face when that face appears within the scanning area of the gaze detector 110. The process of identifying a face can include identifying various facial landmarks, such as the eyes, nose, and mouth. Having identified the face, the gaze detector 110 can then search for and identify the user's pupils. Doing so will then enable the gaze detector 110 to determine the user's gaze, or center of attention.

The gaze detector 110 can also determine a pose or orientation of the user's head. Determining the user's pose can optionally be used to provide additional input into the gaze estimation engine.

Gaze detector 110 can also determine the state or states of the user's eyes. Such states include, but certainly are not limited to, whether the user's eyes are open or closed. The states can also include whether the user's eyes are generally locked on a target (that locking aspect is called a "fixation") or whether the user's eyes are currently moving from one point to another point without remaining at a single point for longer than a threshold time period (such a movement is called a "saccade"). To constitute a fixation, the user's gaze will remain generally locked or resides on a target for at least a minimum threshold time period (e.g., a select number of milliseconds or seconds, such as perhaps 250 milliseconds, 500 milliseconds, 750 milliseconds, 1 second, 2 seconds, 3 seconds, or more than 3 seconds or any amount of time between about 250 milliseconds and about 3 seconds).

The gaze detector 110 can incorporate the use of machine learning or artificial intelligence to assist in tracking the user's gaze. Furthermore, the form factor of the gaze detector 110 can have various different forms. In one example scenario, the gaze detector 110 is implemented as a wearable device, such as perhaps a pair of glasses or some other type of head mounted device (HMD). In another example scenario, the gaze detector 110 is at least somewhat remote relative to the user. For instance, the gaze detector 110 can be performed by a device that is not attached to or contacting the user's body but rather is generally aimed toward the user's face. As an example, the device can include a camera that is attached to or integrated to a computer screen. The user sits in front of the computer screen, and the gaze detector 110 tracks the user's pupil movements. Stated differently, tracking the user's gaze can be performed via a device that is remote relative to the user such that the device is not a wearable device. In some cases, the gaze detector 110 can be implemented in the form of a virtual reality or augmented reality headset. That is, tracking the user's gaze can be performed via a headset that renders virtualized content.

The gaze detector 110 can have various different sampling rates when monitoring the user's gaze. Often, the sampling rate is around 60 Hz. In some cases, the sampling rate is within a range spanning anywhere from 30 Hz to 120 Hz.

In some cases, the gaze detector 110 undergoes an initial calibration event. During this calibration event, the gaze detector 110 is calibrated based on the user's specific characteristics, such as the distance between the user's eyes, the user's eye size, the distance the user is from the gaze detector 110, and so on.

Architecture 100 is also shown as including image 115 that is displayed on a computer screen. Image 115 is one of multiple images that can be displayed on the screen in architecture 100. Any type of image can be displayed. In the example shown in FIG. 1 (and the other figures), image 115 is shown as being a radiology image. Of course, other image types can also be displayed. As will be described in more detail later, the disclosed embodiments are configured to facilitate the analysis of image 115 using gaze detector 110 and various other components. The embodiments are able to help with the training and evaluation of students, or "users," in analyzing image 115. As one example use case scenario, suppose the student is a radiology student. The disclosed embodiments can be used to help train and evaluate the student while the student analyzes image 115. The student may be tasked with identifying specific features or perhaps abnormalities that may be present in image 115. The embodiments can use the gaze detector 110 to examine the user's gaze while the student examines the image 115. By examining the user's gaze, the embodiments can facilitate the learning environment by helping to gauge whether the student actually recognizes the content in image 115 or is incorrect in his/her understanding. Further details on these aspects will be provided later.

Architecture 100 is also shown as including a machine learning (ML) engine 120. As used herein, reference to any type of machine learning may include any type of machine learning algorithm or device, convolutional neural network (s), multilayer neural network(s), recursive neural network (s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The ML engine 120 can also include or be tasked with performing object segmentation 125. As an example, the ML engine 120 can be fed, as input, any number of images, such as perhaps radiology images. The ML engine 120 may be tasked with performing object segmentation on those radiology images to detect the objects that are visually represented within those images. Those objects might be normal physiological objects or they might be abnormalities. In any event, object segmentation can be performed on those images by the ML engine 120.

Those segmented images can then be used as training data for training a student on how to recognize content within a radiology image. At this point, it should be noted that while a majority of the examples disclosed herein are directed to radiology, a person skilled in the art should appreciate how the broader principles can be applied to any type of image or image content. As such, the radiology scenarios are provided as examples only and should not be construed as being the only technical field in which the disclosed principles can be employed.

Architecture 100 is also shown as including a repository 130. Repository 130 can be used to store training data used to help train a student and/or any other type of data. Further details on this repository 130 will be provided later.

Architecture 100 also includes an audio 135 component. The audio 135 component can include an audio recording device and/or an audio playback device. Service 105 is able to use the audio 135 component to relay verbal commands to the student and/or to receive verbal utterances from the student. Those utterances spoken by the student can then be transcribed to text by service 105 via a speech-to-text component. For instance, service 105 is able to record an utterance (i.e. a spoken command or statement from a student/user). An audio recording can be generated for that utterance, and then a transcription of the audio recording can be generated. The transcription is shown in FIG. 1 as dictation 140. At this point, an example will be helpful.

Suppose a student is being trained on how to read and interpret radiology images. In accordance with the disclosed principles, the embodiments are able to display a radiology image (e.g., image 115) to the student (e.g., perhaps on a computer screen or perhaps in a virtual or augmented reality headset). During the training phase, the student may be tasked with identifying various features or objects that are included in image 115. The student examines the image and says what he/she detects within the image. While the user is examining the image, the embodiments monitor the user's gaze via the gaze detector 110. Similarly, the embodiments record the student's utterances via the audio 135 component. The student may be tasked with verbally describing the artifact he/she is currently looking at. The service 105 simultaneously monitors the student's gaze and analyzes the student's utterances.

As a more particular example, suppose the student is examining the skull image shown in image 115. The student's gaze may be directed to the skull's mandible, and the student may speak the following words: "the mandible looks to be normal." The embodiments are able to transcribe the utterance into text and perform text analysis (e.g., perhaps a semantic analysis) on that text, such as by parsing out the various terms and phrases.

In this specific context, the embodiments can parse out the term "mandible" and can identify that term as one that may have relevant meaning with regard to the context of image 115. In some cases, image 115 was previously subjected to object segmentation, so the mandible was previously recognized by the ML engine 120 in image 115. The embodiments are then able to correlate the user's gaze with the transcribed text. If the student's gaze was accurately directed to the skull's lower jawbone while the student spoke about the "mandible," then the embodiments will determine that the student accurately identified the mandible in image 115. Thus, the embodiments are able to analyze the features of an image, discern the direction of the user's focus, and analyze the user's speech. Such processes facilitate an image analysis operation to determine the competency of the user's understanding with regard to an image. Further examples and features will be provided later, but this example is provided as an initial introduction to some of the benefits and features provided by the disclosed embodiments.

Service 105 is also able to generate a mirror display 145. For instance, suppose an instructor is assisting in the training process. The student can be presented with a display of image 115. Additionally, the instructor can be presented with a copy of the image; this "copy" is included in mirror display 145. Optionally, mirror display 145 can include a heat map 150 that represents areas in image 115 where the student is looking. For instance, a mini heat map can be displayed and/or a heat map can be overlaid onto the image. The pixels in the heat map can optionally change color to reflect where the user is looking. In some cases, the student's display refrains from displaying the heat map. In other cases, the student's display can be configured to display the heat map.

Mirror display 145 can include a tracer overlay 155 that visually documents or indicates areas of the image 115 where the student is looking or has looked. Similarly, mirror display 145 can visually indicate areas in image 115 where the student paused in his/her looking, as represented by the pause points 160. Each of these various different features will be discussed in more detail shortly. In some embodiments, the tracer overlay 155, the pause points 160, and the heat map 150 can also be displayed on the student's display.

In some embodiments, the repository 130 can include any number of pre-processed image(s) 165 that have been subjected to object segmentation and/or that have been subjected to review, perhaps by a human instructor. In some cases, an expert instructor may have been previously tasked with analyzing the image(s) 165 to identify relevant artifacts. During that analysis, the instructor's gaze may have been monitored, and the gaze patterns the instructor used to analyze the image(s) 165 may be documented and recorded, as shown by pattern(s) 170. An expert instructor knows and understands how to efficiently and thoroughly review an image. The pattern that the instructor uses to review the image can also be used to instruct a student, so the student can also learn the efficient and thorough techniques for reviewing images. Further details on this aspect will also be provided later.

Accordingly, the disclosed embodiments are able to utilize a service 105 that can monitor how a student or user reviews an image. During that review, service 105 can monitor the user's gaze direction as well as the user's utterances. The user's utterances describe the portions of the image that the user is currently focusing his/her attention on. The embodiments can parse out the terms in the utterances and compare it to the user's gaze direction. The embodiments can determine whether the user is correctly focusing on the object that he/she is verbally describing. In this regard, the embodiments can greatly facilitate processes involved with performing image analysis, training, and evaluation. Beneficially, the disclosed principles can be used to bring novice image reviewers up to a high level of competency in a relatively short period of time.

Individual Training Phase

Figure 2:
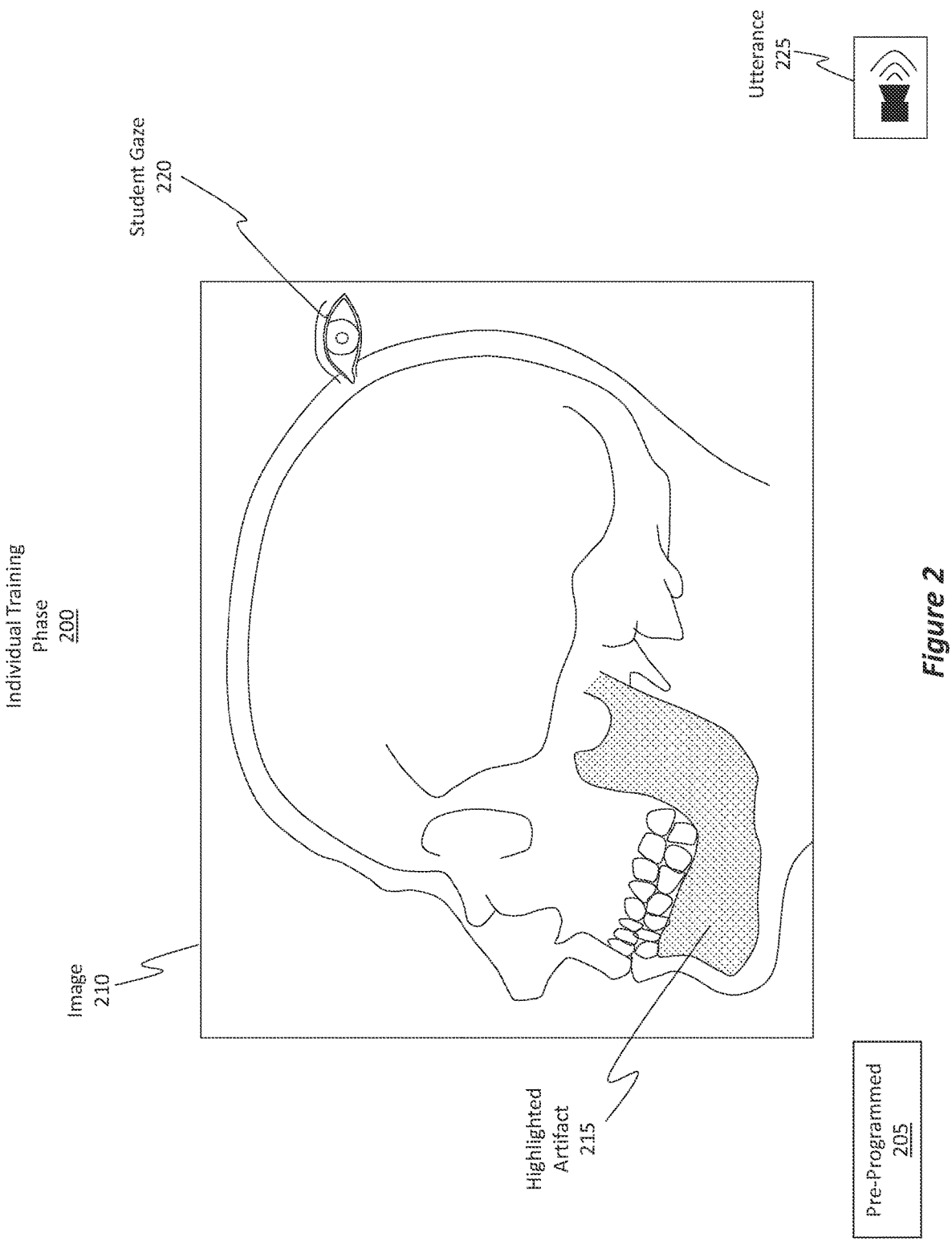
FIG. 2 illustrates an example training phase in which a student's gaze is being analyzed during an image analysis scenario.
Figure 3:
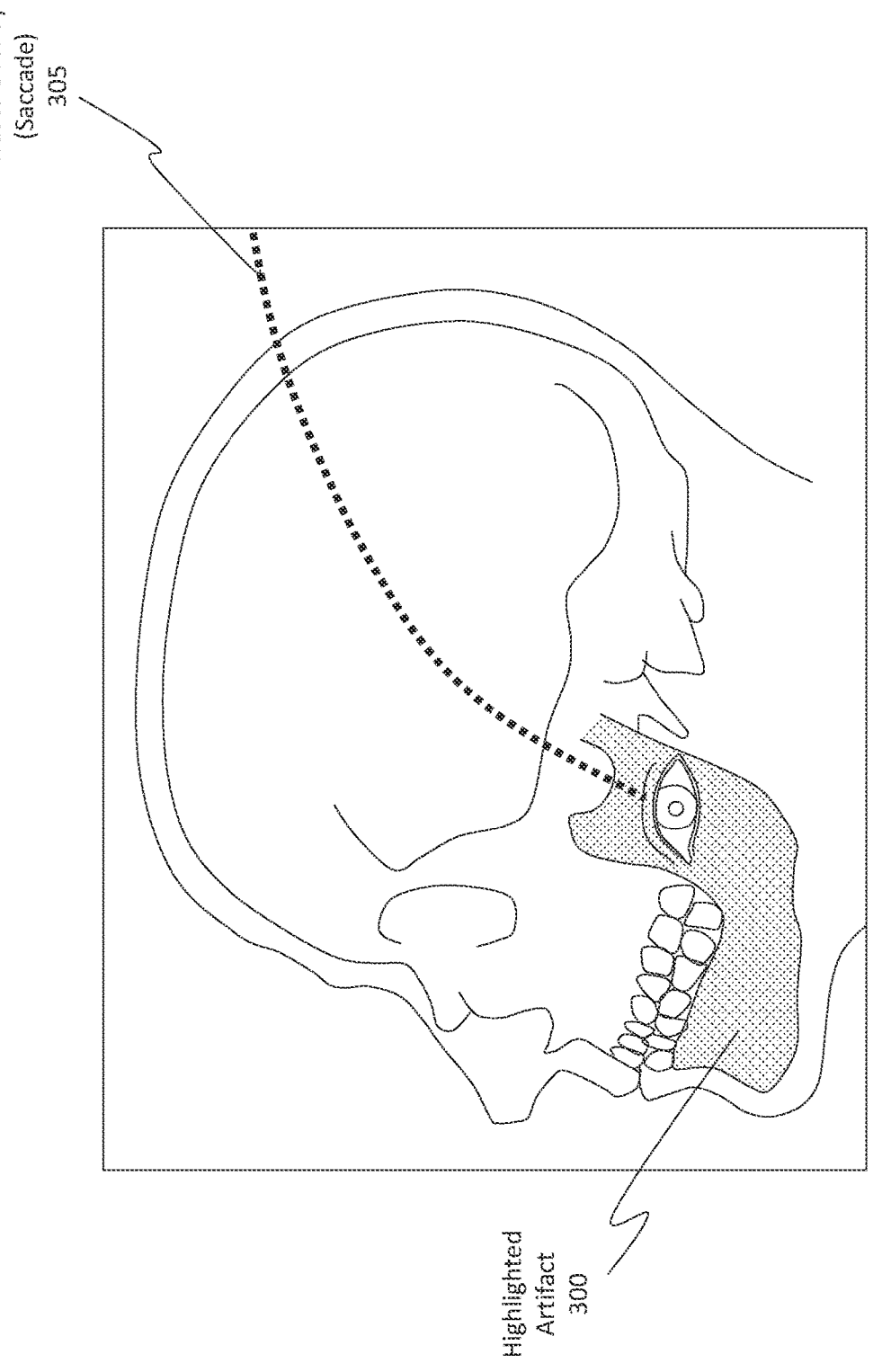
FIG. 3 illustrates another example training scenario.
Figure 4:
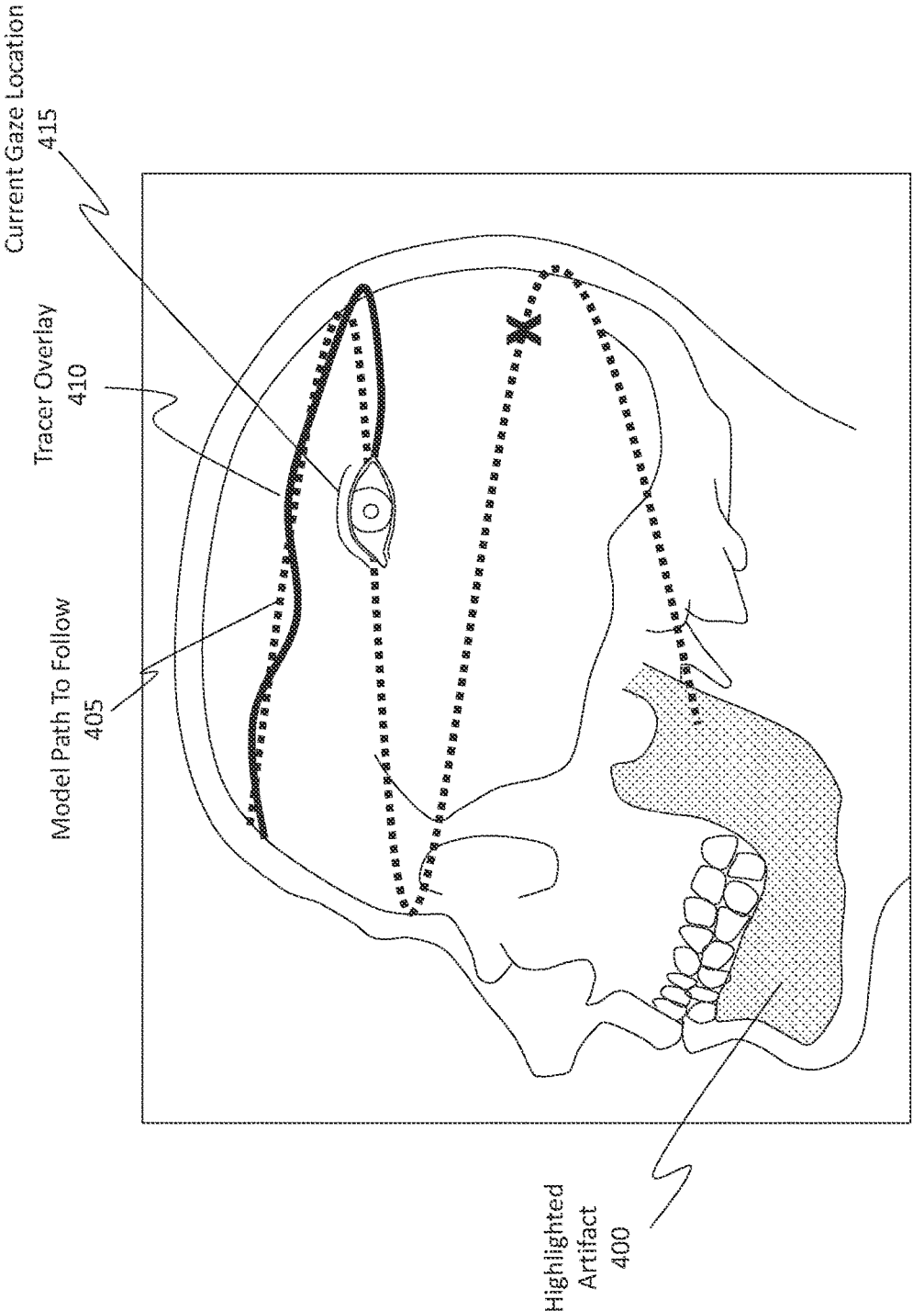
FIG. 4 illustrates yet another example training scenario.

Attention will now be directed to FIGS. 2, 3, and 4, which illustrate various examples of a so-called "Individual Training Phase." Such training can be performed using architecture 100 of FIG. 1, and particularly the service 105.

FIG. 2 shows an individual training phase 200 that can be implemented by service 105. The service may have previously analyzed a number of images by performing object segmentation on those images. Thus, these images can be considered to be pre-programmed 205. In this example, FIG. 2 shows a "primary" or simplified training experience for extremely novice users.

The service displays image 210 on a display for a student to view and analyze during the training phase. In this phase, the service can optionally guide the student in the learning process. For example, in this scenario, the service audibly commands the user to look at a particular portion of the image. That portion can be highlighted by the service, as shown by highlighted artifact 215. The service monitors the student's gaze, as shown by student gaze 220. The service can provide audio commands and/or text commands. Additionally, the service can record an utterance 225 spoken by the user while the user is looking at the displayed image. Thus, in this scenario, the service identifies a particular object in the image and also textually and/or audibly describes what the object is. For instance, the skull's mandible can be highlighted, and the service can inform the user that the highlighted portion is the mandible. Thus, the service is providing a significant amount of information to the user so the user can learn.

FIG. 3 shows the progression of the user's gaze from the top right of the image to the highlighted artifact 300. This documented progression is referred to as a tracer overlay 305, which reflects the saccade of the student's gaze and which is visually displayed. Once the student's gaze lands on the highlighted artifact 300, the student is now fixated on the object. Thus, the embodiments are able to track the student's gaze path and are able to visually display an indicator that reflects the gaze path, as represented by the tracer overlay 305.

FIG. 4 shows an example scenario where the student is being instructed on an efficient technique or pattern for reviewing images of a particular type or images that have specific content. In this example, the user is directed to look at the highlighted artifact 400. Prior to focusing his/her attention on that object, however, the service may instruct the student to follow a designated gaze path in order to reach the highlighted artifact 400. For instance, medical professionals may be liable for undetected illnesses that are detectable within a radiology image but that were not actually detected by the medical professional. By teaching or instructing a medical student to use a particular gaze path when reviewing radiology images, those medical students can learn how to not "miss" illnesses.

In the example shown in FIG. 4, a so-called model path to follow 405 is visually displayed and overlaid on the image. In some cases, this model path to follow 405 was generated based on the pattern(s) 170 that were mentioned in connection with FIG. 1. For instance, the gaze paths or patterns of multiple expert instructors may have been recorded and perhaps aggregated together to generate the model path to follow 405. This model path to follow 405 effectively represents the general consensus or the averaged version of the gaze paths that multiple expert instructors used when reviewing an image, where that image has similar characteristics to whatever image is currently displayed to a student. Because of the similarity, the gaze path for the student's image can be similar to the gaze path of whatever image was displayed to the experts.

Stated differently, multiple different expert instructors may be tasked with analyzing an image. The gaze paths of those instructors can be recorded. Service 105 is able to generate an aggregated or normalized version of those gaze paths to generate the model path to follow 405. In this sense, the model path to follow 405 represents how a majority of experts would track and review an image. The students can be trained using this aggregated information.

As shown in FIG. 4, the model path to follow 405 can be displayed for the student to observe. The student may then be instructed to follow that model path to follow 405 (with his/her eyes) while reviewing the image. The embodiments are able to generate a tracer overlay 410 reflecting the student's actual gaze path as compared to the model path to follow 405. The student's current gaze location 415 can also be displayed for the student to see. Eventually, as the student's gaze follows the model path to follow 405, the student's gaze will land on the highlighted artifact 400. In some scenarios, the service may call out specific points of interest that should be called to the student's attention while the student's gaze is traversing the model path to follow 405.

For instance, there may be a tumor (or some other illness or abnormality) located at point "X" in the image. If the student were to simply direct his/her attention immediately to the highlighted artifact 400, then the student may have missed the tumor. By instructing the student using the model path to follow 405, the embodiments can facilitate the image analysis training process and can help students avoid scenarios where they miss things that should have been detected.

In some embodiments, the service delays informing the student of the extra object (e.g., the tumor in this example) until such time as the student's gaze lands on that object (e.g., until the student's gaze lands on the "X"). Once the student's gaze lands on the "X", the service may audibly inform the student that an abnormality exists at point "X." In some instances, the service will immediately inform the student as to what the abnormality is. In some instances, the service can query the student as to what the student thinks the abnormality is. The service can then record an audio recording of the student's uttered response and parse out that recording to determine the student's response. The service can then compare the student's response against what the correct answer is. The service can then inform the student as to whether the student was correct or not.

Different levels of individual training can be provided by the service. In the previous "primary" examples, the service highlighted a desired portion of an image and instructed a student to look at that portion. This training phase can be considered as a "new", "primary", or "elementary" training phase for a new student.

With an "intermediate" training phase, the service may audibly instruct the student to look at a particular artifact of the image, but the service may refrain from highlighting or visually emphasizing that artifact. Instead, the service allows the student to attempt to find the particular artifact on his/her own. The service can track the student's gaze to determine if the student successfully landed on the desired artifact. If the student does successfully land on the desired artifact, then the service can audibly state that the student was successful. In some scenarios, the service can also visually display an alert regarding the student's success.

If the student was not successful, the service can inform the student (e.g., audibly or via displayed text) that the student should try again. If, after a number of failed attempts, the student still cannot find the artifact, then the service may display a generalized boundary in the image and/or may emphasize a generalized area in the image and inform the student that the desired artifact is somewhere within the confines of the boundary. If the student still cannot find the desired artifact, then the service can resort to highlighting or emphasizing the artifact.

With an "advanced" training phase, the service may display an image to a student and instruct the student to report on what the student finds without providing the student any hints or guidance. The student is then tasked with reviewing the image and audibly describing what he/she sees. The service again tracks the student's gaze and records the student's utterances. The service can map or compare the student's utterances with the student's gaze to determine whether the student's descriptions are correct (e.g., if the student muttered "mandible," was the student actually looking at the mandible artifact in the image). The service can evaluate the student's progress and can determine whether the student correctly identified all the points/artifacts of interest within the image.

As an example, the student may be tasked with identifying all the anatomy features included in a radiology image. The student is to look at the anatomy image and then speak aloud describing what that student is looking at. The service can determine whether the student, while looking at a particular anatomical feature, correctly described that feature audibly. The service can also determine whether the student completely finished the task.

In another example, the student may be tasked with identifying diseases or abnormalities in a radiological image. The service again can monitor the student's gaze and utterances and determine the student's performance.

Thus, a tiered training approach can be implemented by the disclosed embodiments. This "individual" training phase can be performed using a set of pre-programmed or pre-analyzed images that have optionally been subjected to machine learning to identify the various artifacts of an image.

As another example, the embodiments can be configured to cue a user to look at a particular region or object displayed in an image. For instance, in the instructor-led scenario, the instructor can trigger a cue for the student to look at a particular object. That cue can be a visual cue, an audio cue, or any other type of cue. If the student is wearing a wearable device, the cue can even be a haptic type of cue. The cue is designed to direct the student's gaze to a specific location.

In another example scenario, it may be the case that a student has not looked at a particular object or region for a threshold period of time. Another cue can be provided to trigger or prompt the student to look at the desired object. Doing so may help supplement the student's awareness of what is being displayed.

In yet another example scenario, the embodiments are able to track the student's gaze progress. If a student misses a feature that is determined to be relevant, a cue can be provided to redirect the student's gaze to the designed location. For instance, the relevant feature can be visually emphasized in some manner, such as by causing the feature to flash a selected number of times or by causing the feature to be highlighted. The color of the feature can be changed. The feature's border can be boldened, flashed, or otherwise visually modified. Such actions all constitute different types of visual cues. Audio cues can also be provided, with directions on where to look. The audio directions can be played simultaneously with any number or type of visual cues.

Instructor Led Training Phase

Some embodiments additionally, or alternatively, incorporate an instructor led training phase 500, as shown in FIG. 5. With this phase, an instructor is present or at least accessible to guide the student in the learning process. In some scenarios, the student and trainer might be in the same room while in other cases, the student and trainer may be physically remote from one another.

The student is presented with a student display 505 on which an image is displayed for the student to review and analyze. The service can verbally and/or textually command the student to perform various different actions, as shown by the audio 510 component. For instance, if the student is a beginner, the service can instruct the student to find a specific artifact within the image (e.g., the mandible of the skull). Higher level instructions can also be provided, such as "review the image and say what you find." The audio 510 component can also record utterances made by the student.

In this scenario, the student is being trained and/or evaluated by an instructor. The instructor is presented with an instructor display 515 that is separate from the student display 505. Typically, the student will not be able to see the instructor display 515. The instructor display 515 is showing the same image as is displayed in the student display 505.

In this scenario, however, the service can visually emphasize or highlight image artifact 520 (i.e. the artifact that the student is tasked with finding). One or more desired objects can be identified and emphasized in instructor display 515. Thus, the instructor can readily observe what artifacts are of interest.

The service also visually indicates fixation 525, which is the student's current gaze direction, as determined by the gaze detector. In some scenarios, fixation 525 is displayed only in instructor display 515. In other scenarios, fixation 525 can be optionally displayed in the student display 505. Fixation 525 can be shown via any type of indicator, such as perhaps a bubble, icon, or some other indicator (e.g., perhaps even an "eye" icon).

The service also visually emphasizes the actual artifact that is the student's current focus point, as shown by artifact in focus 530. Stated differently, the service can visually emphasize or highlight whatever portion of the image the student is actually looking at. This emphasis can occur in instructor display 515. Optionally, the emphasis can also be shown in student display 505.

The service also shows the tracer overlay 535, which is the gaze path the student took to eventually focus on the artifact in focus 530. Optionally, a similar tracer overlay 535 can be displayed in the student display 505.

In this example scenario, the student was supposed to look at the image artifact 520; instead, the student is incorrectly looking at the artifact in focus 530. The service is able to record utterances of the student and determine if there is a misunderstanding in regard to what the student is looking at and what the student believes he/she is looking at based on the student's utterances. For instance, the student might be tasked with looking at the skull's upper jaw. In this scenario, however, the student is actually looking at the skull's mandible, or lower jaw. If the student utters that what he/she is looking at is the upper jaw, but in reality the student is looking at the lower jaw, then the instructor can be immediately informed via the content that is displayed in the instructor display 515 that the student is incorrect in his/her assessment. In such a scenario, the instructor can then provide corrective guidance. From this example, a skilled person should be able to readily discern how the disclosed embodiments can greatly benefit the training process of a student in reviewing and analyzing image content.

Figure 6:
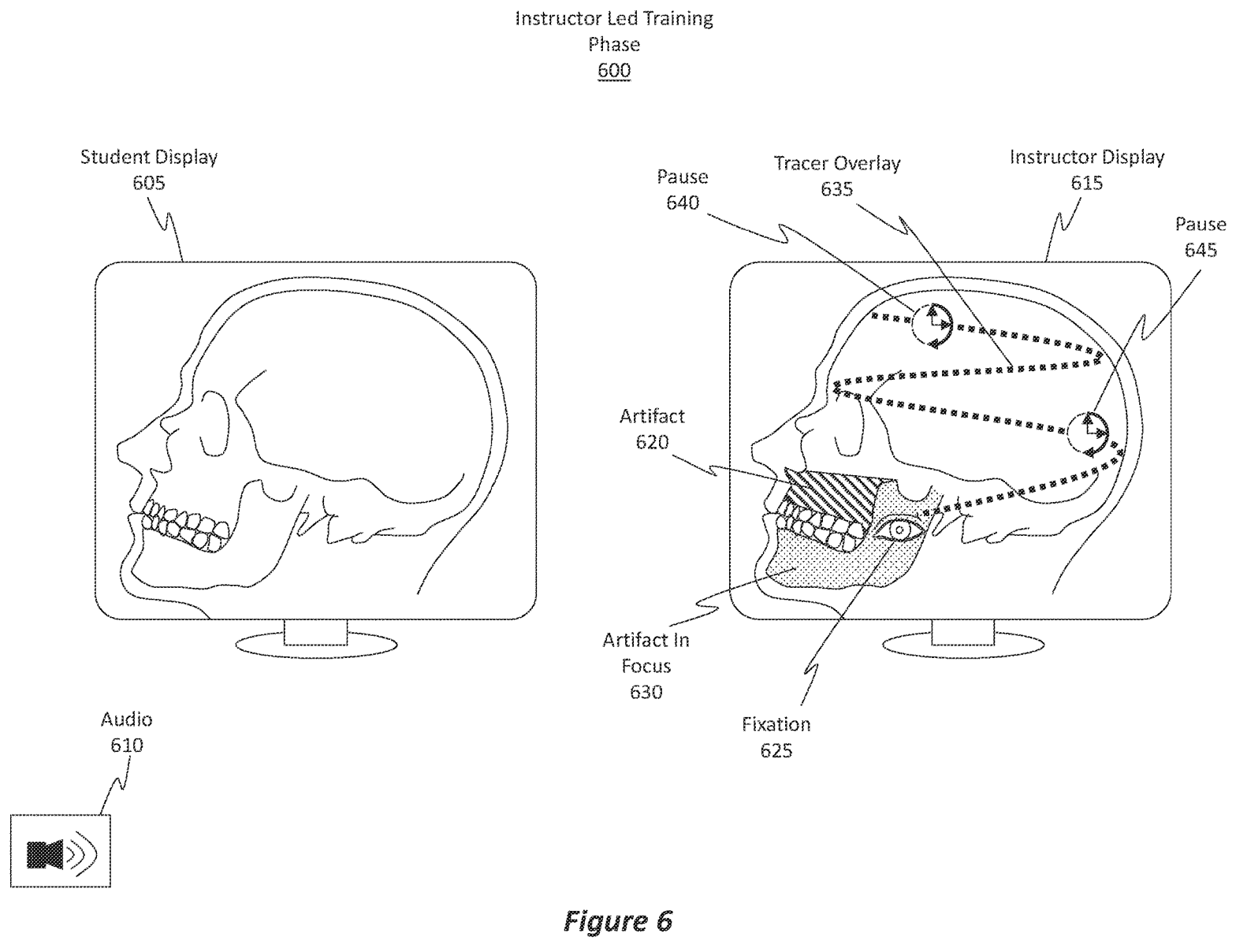

FIG. 6 shows another scenario involving an instructor led training phase 600. Here, the student is presented with the student display 605 and optionally audio 610 commands. The instructor is presented with the instructor display 615.

In this scenario, not only is the instructor evaluating the student on whether the student's gaze landed on the correct artifact in the image, but the instructor is also evaluating the student's gaze path. For instance, the instructor display 615 is shown as displaying artifact 620, the fixation 625, and the artifact (actually) in focus 630.

The instructor display 615 is also showing the tracer overlay 635, which visually documents or indicates the path the student's eyes took to eventually reach the artifact in focus 630. The service is able to visually display a marker or indicator to show times when the student's eyes paused on another artifact in the image. For instance, FIG. 6 shows a marker labeled pause 640 and a marker labeled pause 645. At these respective locations, the student paused his/her gaze for an amount of time that surpassed a threshold time period (e.g., a select number of milliseconds or perhaps seconds). Because the student's gaze paused at these locations, the service marked those locations in the instructor display 615. The instructor can inquire as to why the student paused at those locations.

Figure 7:
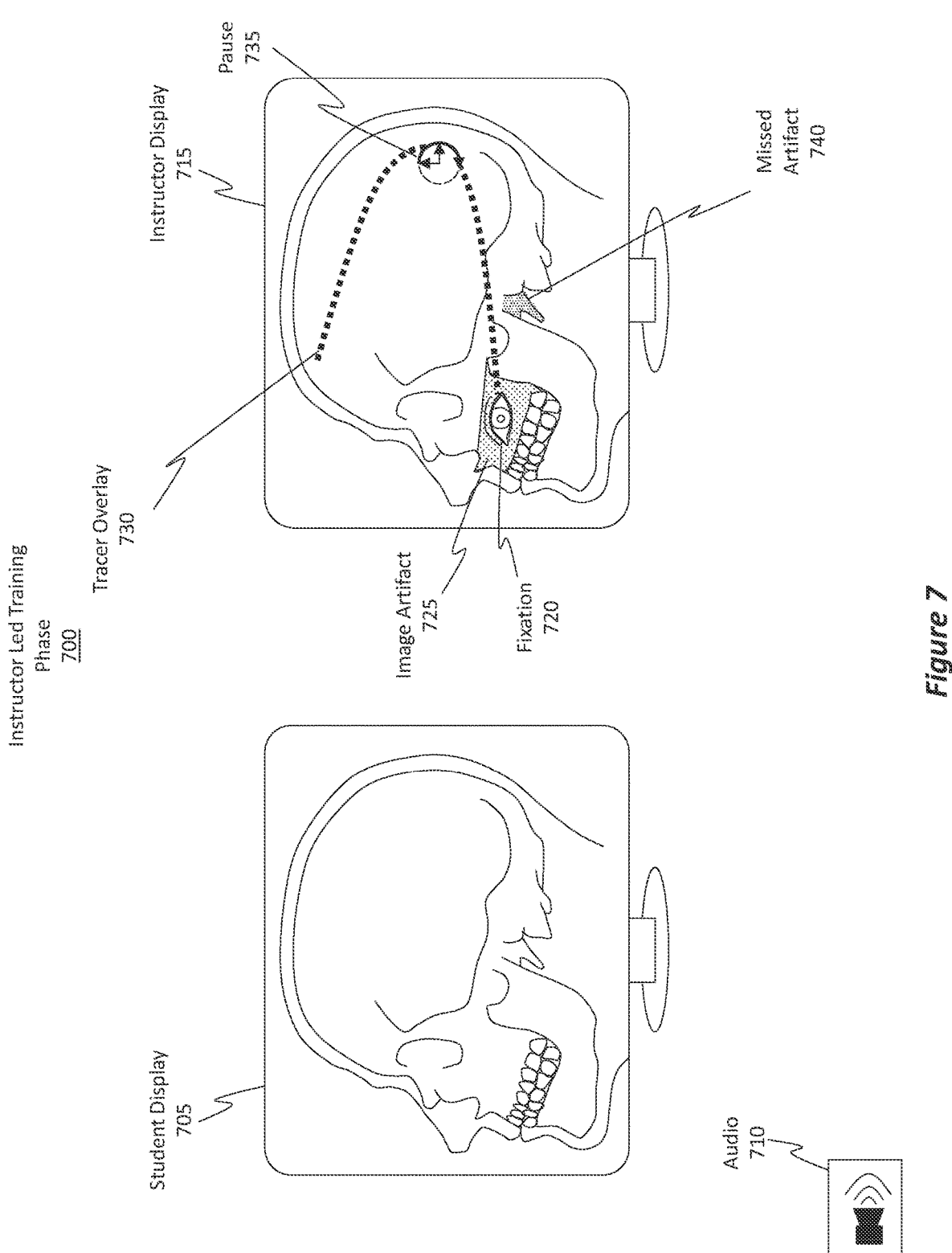
FIG. 7 illustrates yet another instructor led training scenario.

FIG. 7 shows another instructor led training phase 700. A student is shown the student display 705 and optionally provided audio 710 instructions. An instructor is shown the instructor display 715. The instructor display 715 documents or indicates the fixation 720 as well as the image artifact 725. The instructor display 715 also visually indicates the tracer overlay 730 of the student's gaze path as well as a marker showing where the student's gaze was paused, as shown by pause 735.

In this example scenario, the student missed the identification of a relevant artifact in the image, as represented by missed artifact 740. That is, the student should have identified and paused his/her gaze at this artifact, but the student neglected to do so. The service is able to inform the instructor regarding this "miss," and the instructor is then provided the opportunity to educate the student on what he/she missed. The artifact that was missed can be highlighted or emphasized in instructor display 715 at any time, even at the onset of the instruction process. Any number of artifacts of interest can be included in the image on the instructor display and can be visually emphasized. As the student correctly identifies each artifact of interest, the color scheme, highlighting, boldness, or emphasis of that artifact can change to reflect a change in identification status. If a student misses an artifact (e.g., the student's gaze path either goes over the artifact without pausing or the student's gaze path never passes over the artifact), then the color or emphasis of that artifact can likewise change to reflect a "missed" status.

Individual Evaluation Phase

Figure 8:
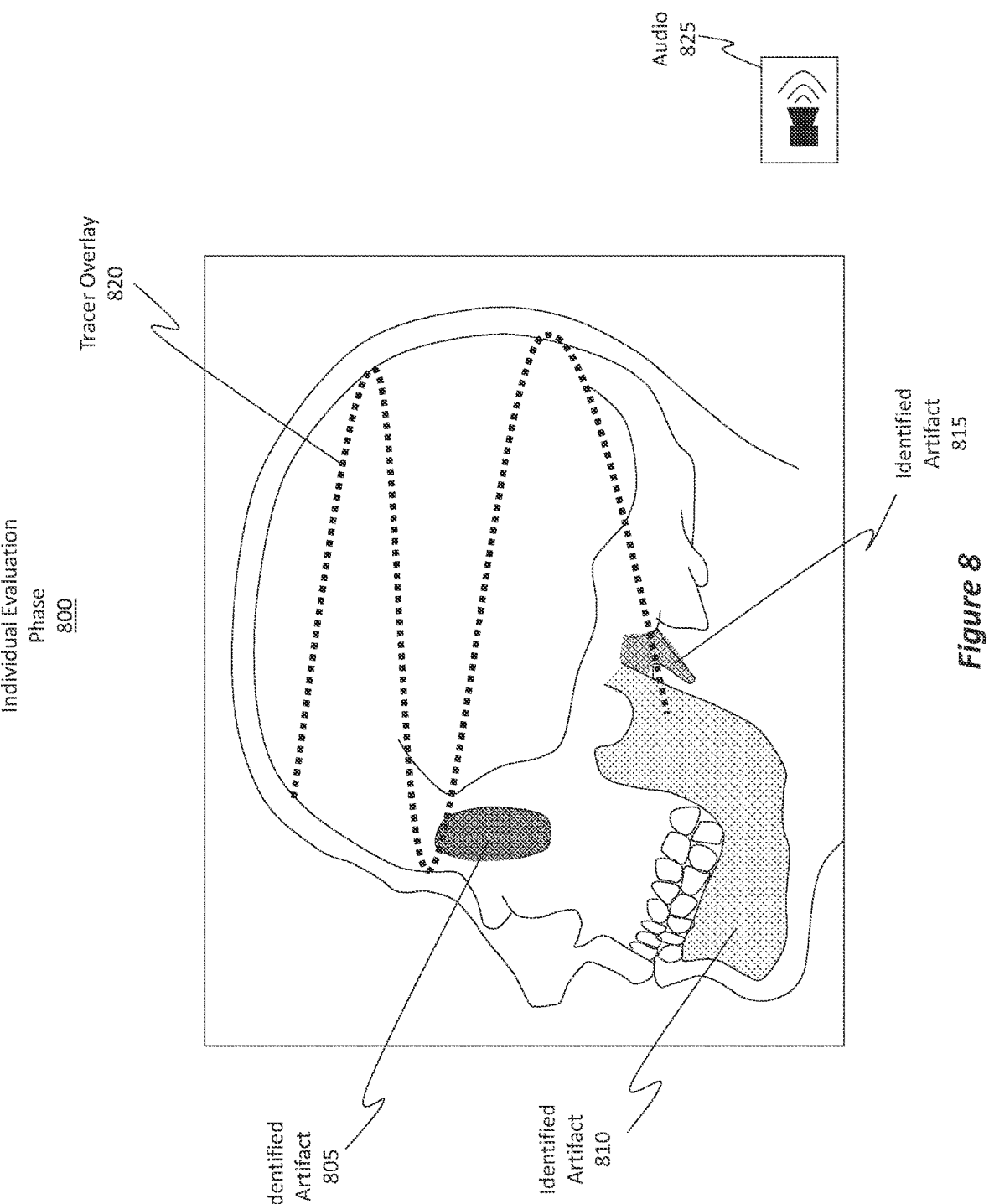
FIG. 8 illustrates an evaluation phase in which a student's gaze is monitored while the student is being evaluated.

In addition to training, the embodiments can also be used to grade or "evaluate" students on their ability to review an image. FIG. 8 shows an example scenario involving an individual evaluation phase 800. Here, a student may be tasked with identifying artifacts that may be of interest. For instance, if the image is a radiological image, then the artifacts of interest may be any artifact that may indicate a health issue for a person.

FIG. 8 shows a number of identified artifacts that the student found to be of interest, as shown by identified artifact 805, identified artifact 810, and identified artifact 815. FIG. 8 also shows the tracer overlay 820 detailing the gaze path the student followed when reviewing the image. Similarly, FIG. 8 shows an audio 825 that records the students' utterances while describing what he/she saw in the image. The identified artifacts can be compared and contrasted against the student's recorded utterances to determine if the student correctly identified the artifacts. The gaze path of the student can also be compared against the gaze path that an expert would follow when reviewing the same or similar image. An example is shown in FIG. 9.

Figure 9:
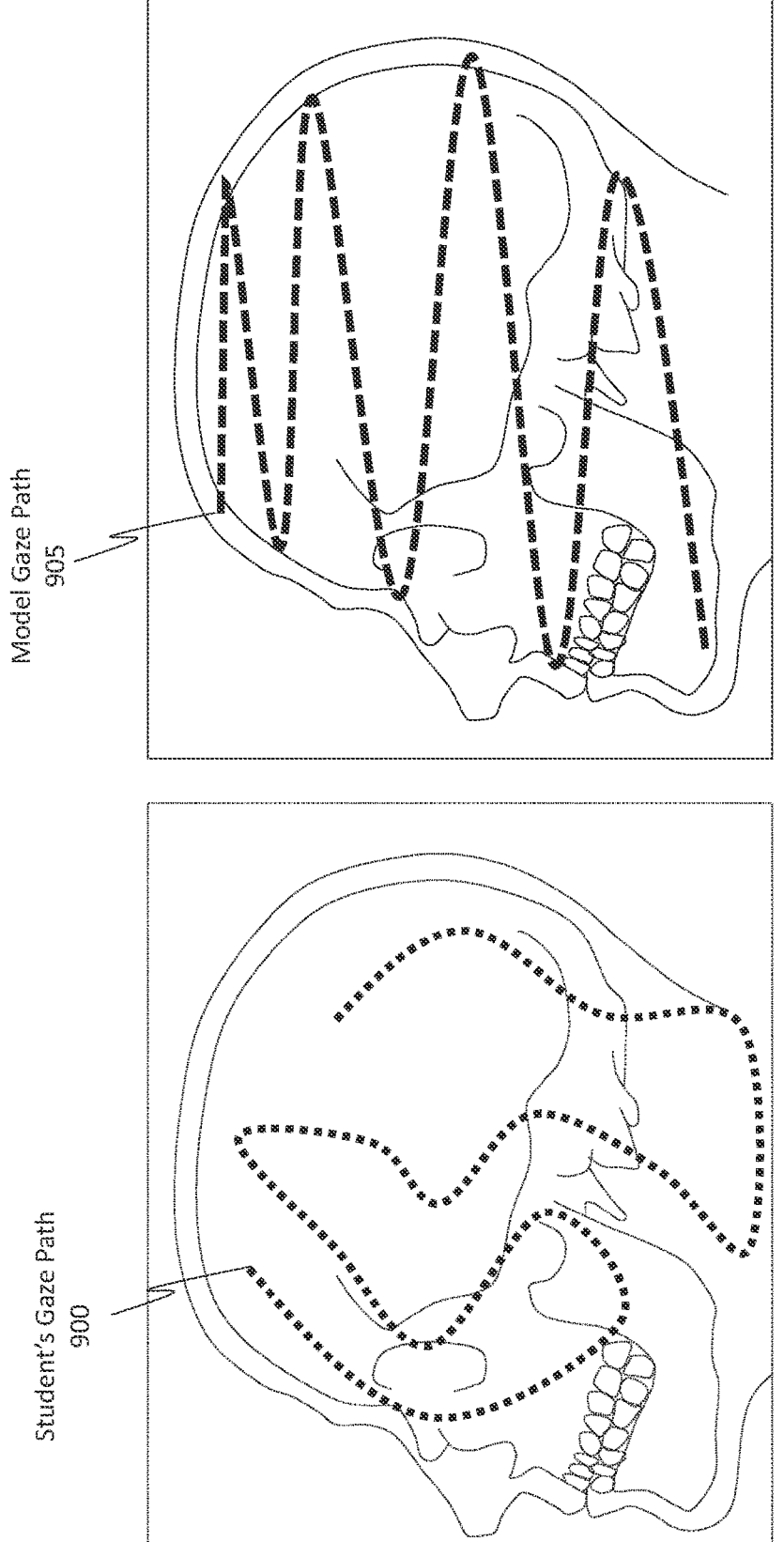
FIG. 9 illustrates how a student's gaze path can be compared against a model gaze path.

FIG. 9 shows one scenario illustrating the student's gaze path 900. FIG. 9 also shows the model gaze path 905, which is representative of a gaze path that an expert reviewer would have followed to review the same or similar image. The embodiments are able to compare the student's gaze path 900 to the model gaze path 905 to determine how closely the two align with one another. If the two paths deviate by more than a threshold amount, then the embodiments can be triggered to instruct the student and to educate the student regarding the model gaze path 905.

In some cases, the "threshold" amount of deviation can be based on one or more different factors. For instance, the threshold difference amount can be based on a pixel offset that exists between the student's gaze path 900 and the model gaze path 905, perhaps converted to a normalized time frame. For instance, the amount of time the student used to traverse the student's gaze path 900 and the amount of time used to by an expert to traverse the model gaze path 905 can be normalized. The two paths can be compared across the normalized time, and the pixel offset can be determined. If the pixel offset exceeds a defined pixel threshold, then the embodiments can determine that the student's gaze path is sufficiently different from the model gaze path 905.

In some scenarios, the "threshold" is based on the number of differences that exist per unit of length for the gaze paths. For instance, the entirety of the two gaze paths can be split into a number of different sections (e.g., the sections can be equal in length or different in length). Each respective section can then be compared between the two gaze paths. If a threshold number of sections are sufficiently different (based on a difference threshold) as between the two gaze paths, then the embodiments may trigger an alert to the student.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
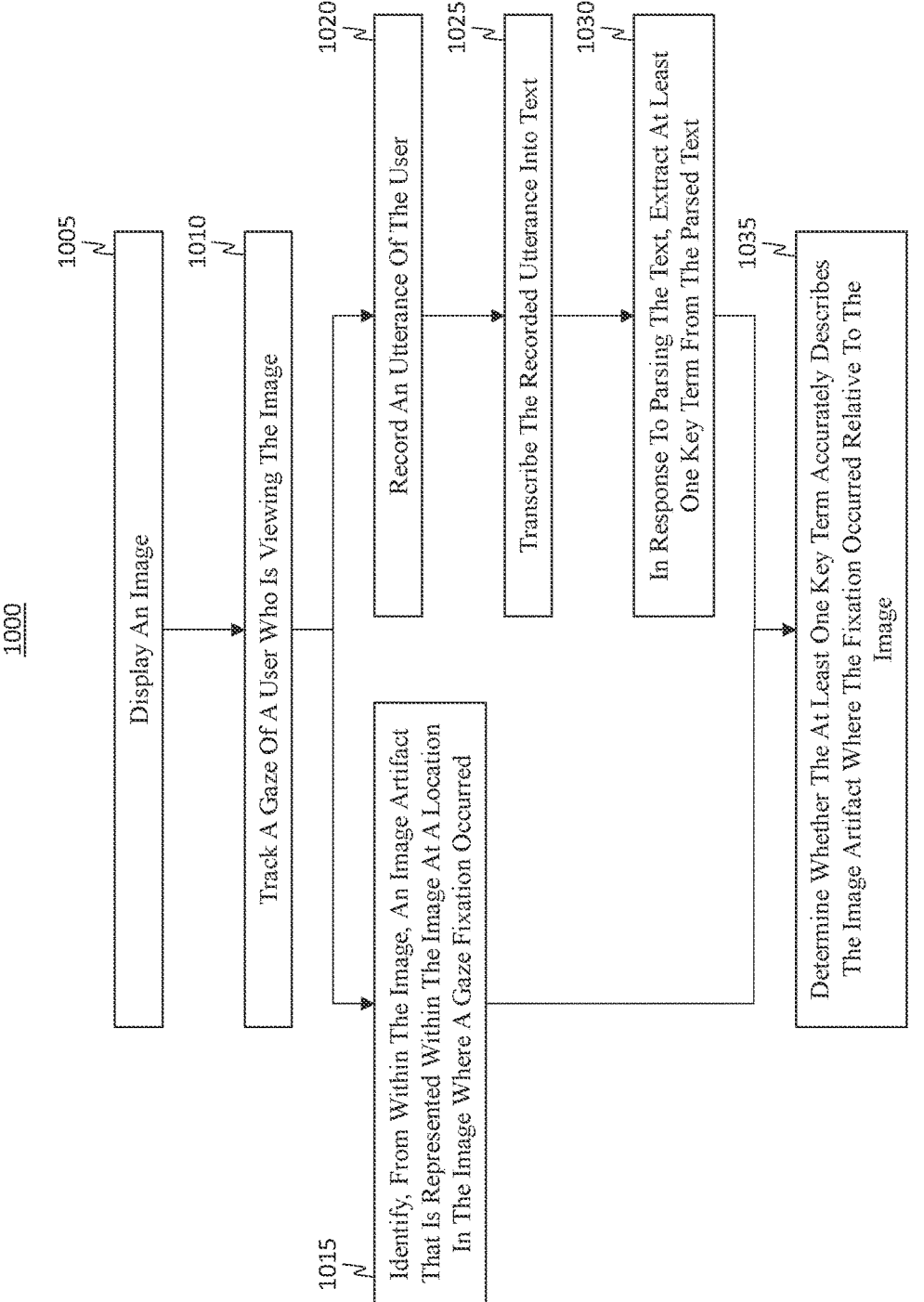
FIG. 10 illustrates a flowchart of an example method for performing image analysis using gaze detection and utterance dictation.

Attention will now be directed to FIG. 10, which illustrates a flowchart of an example method 1000 for facilitating an evaluation of an image by comparing an identified image artifact included in the image against a gaze fixation that is directed toward the image artifact and against an utterance that is also associated with the image artifact. Method 1000 can be implemented within architecture 100 of FIG. 1; furthermore, method 1000 can be performed by service 105.

Method 1000 includes an act (act 1005) of displaying an image. For instance, in one example scenario, image 210 from FIG. 2 can be displayed.

While the image is displayed, act 1010 includes tracking the gaze of a user who is viewing the image. The process of tracking the gaze includes identifying a gaze fixation of the user with respect to the image. The gaze detector 110, which can optionally be an integrated part of the service 105 or a remote entity relative to the service 105, can be used to track the user's gaze. As mentioned previously, the gaze detector can have various different forms, without limit.

Act 1015 includes identifying, from within the image, an image artifact. This image artifact is represented within image at a location in the image where the gaze fixation occurred. As an example, FIG. 7 shows a scenario where the user's fixation 720 is currently directed to the image artifact 725. The embodiments are able to identify the image artifact 725. In some implementations, this identification process is performed via machine learning, such as perhaps by object segmentation. In some implementations, this identification process is facilitated by an instructor who is aware or who knows what the image artifact represents. The instructor can optionally inform the service what the image artifact is.

Act 1020 includes recording, while the image is displayed, an utterance of the user. This utterance is recorded during an overlapping time period with when the gaze fixation occurred. For instance, while the user's fixation 720 in FIG. 7 is directed to the image artifact 725, the user (i.e. student) can speak or "utter" what he believes he is looking at. For instance, with reference to FIG. 7, the user may utter the phrase "I am looking at the upper jaw of a human's skull." This utterance occurred during the same or overlapping time period as when the user was looking at image artifact 725.

Act 1025 includes transcribing the recorded utterance into text. For instance, a speech-to-text transcription engine can be used to perform this act.

In response to parsing the text (e.g., in some cases, machine learning can also be used to parse the text), act 1030 includes extracting at least one key term from the parsed text. Using the example from above, the embodiments parse the sentence "I am looking at the upper jaw of a human's skull" into a number of tokens or key terms/phrases. The embodiments can optionally perform a semantic analysis on the text. In this example scenario, the embodiments parse out the phrase "upper jaw" from the text, and the embodiments determine that the user believes he/she is looking at the "upper jaw" in the image. Stated differently, the embodiments parse out terms that may have meaning or relevance within the context of the image that is being displayed.

Act 1035 then includes determining whether the key term accurately describes the image artifact where the fixation occurred relative to the image. To complete the above example, in this scenario, the user was actually looking at the upper jaw in the image. Thus, the user was correct in his/her description. For instance, in some implementations, the image artifact is tagged with metadata describing subject matter of the image artifact. The process of determining whether the key term accurately describes the image artifact is performed by comparing the metadata against the key term. Stated differently, the image artifact may be associated with label data describing the subject matter of the image artifact. This label data can be generated using a machine learning engine and/or may be manually provided via user input.

In contrast, if the user said "I am looking at the upper jaw" with regard to the scenario shown in FIG. 6, then the user would be wrong. In FIG. 6, the user is actually looking at the lower jaw, or mandible, of the human skull. The embodiments can evaluate the user's fixation along with the user's utterance. The embodiments can also evaluate the actual artifact represented in the image where the user is fixating. Based on (i) the information about the actual artifact, (ii) the user's fixation, and (iii) the user's utterance, the embodiments can evaluate the user's performance with regard to analyzing an image.

Accordingly, in some scenarios, the embodiments perform an initial calibration of the gaze detector, where this calibration is performed based on the position of the user and that user's eyes relative to the gaze detector. The embodiments can also initialize the display screen, image(s), and voice recording systems. The user/student/trainee is then tasked with evaluating or analyzing whatever images are displayed on the screen. While the trainee is performing this task, the trainee dictates or documents his/her findings. Simultaneously, the embodiments track the trainee's gaze and determine whether what the trainee is saying corresponds with what the trainee is actually looking at. The trainer/instructor, if present, can optionally provide real-time comments or directions to the trainee. The trainee can re-evaluate the images on the screen and can identify any new findings or artifacts based on the trainer's direction.

In some cases, the trainee may be asked to look at or trace specific artifacts or features found in an image. That is, an instruction can be provided to the trainee to prompt the trainee's gaze to follow a specific gaze pattern when the image is displayed. In some cases, a particular image artifact may be overlapped by or positioned proximately to the specific gaze pattern. The embodiments can determine whether the trainee's gaze fixated on the particular image artifact while the trainee's gaze followed the specific gaze pattern. The trainer can re-evaluate the trainee based on the eye-gaze information that is overlayed on the trainer's display, which is displaying the same image as is displayed to the trainee but which includes augmented or supplemental information (e.g., tracer overlay, gaze position bubble, pause markers, etc.). After completing a trace, the eye tracking and audio recording can be paused or stopped. The video of the trainee's eye gaze overlay video can be played back to show the trainee how he/she evaluated the artifacts in the image. The trainer can optionally provide additional feedback and suggestions for future improvement during the video playback. Visual cues and/or audio cues can be provided to the trainee while the trainee's gaze is being tracked.

In some implementations, a touchscreen device is provided to display the images to the student. The student can optionally annotate the images while conducting his/her analysis of the image. These annotations can be examined by the service as well (e.g., perhaps the ML engine) and can be combined with the gaze tracking data and the utterance transcription data. Thus, a combination of visual cues, verbal cues, and even annotation cues can be used to evaluate the trainee. Accordingly, significant improvements in training and evaluating students can be achieved by following the disclosed principles.

Additional Example Use Cases

The above examples primarily focused on instructor and student scenarios. One will appreciate how the disclosed principles can be employed in numerous other scenarios as well, such as in diagnosis scenarios, gaming scenarios, and so on.

As an example, consider a scenario where a user has a mental or physical limitation of some sort, such as perhaps autism. The disclosed embodiments can be employed to facilitate the evaluation of a user, particularly with regard to identifying, assisting in the diagnosis of, or potentially assisting in the treatment of a limitation. Using the autism example, the embodiments can be used to help with the diagnosis of whether a user has autism. The user can be tasked with performing various actions using the disclosed systems. That user's behavior can be tracked and monitored. The results of that monitoring can then be used to determine whether the user has a specific type of limitation. For instance, if the user is instructed to look at a particular location, but the user's behavior does not match the instruction, then that behavior can be used to help with a diagnosis. Thus, the embodiments can be used to help identify or diagnose medical conditions.

The disclosed principles can be employed in gaming scenarios, particularly with children, to help evaluate a child's progress or to help with early intervention or detection. For instance, a gaming application can incorporate the disclosed principles. That game may be suitable for children to play. As the child plays, the embodiments can track the child's behavior, and that behavior can be analyzed. The analysis can help preemptively detect any potential behavioral or pathological issues the child might have. Similarly, the disclosed principles can be used in an educational setting for children playing a gaming application, such as one played on a handheld device.

In some cases, touch input from the user can also be received and analyzed. That is, the touch input, the key term from the parsed text, and data for the gaze fixation can be combined and analyzed and used to determine whether the image artifact is accurately being described. Many of the above examples focused on the scenario where a user is looking an at image. It will be appreciated, however, how the disclosed functions can be implemented in a scenario where multiple images are displayed to a user. Thus, any number of images can be used. In some cases, those images are displayed simultaneously with one another. In some cases, multiple images can be displayed in a serial manner, such as a scenario where a user looks through an entire set of images (e.g., perhaps in a scrolling manner or a sequential listing of medical images).

In some implementations, a trainer can sit in front of an eye tracker and visibly show the trainee what the trainer is looking at in real time as the trainer is explaining his/her track pattern. Such a scenario can activate a mirroring implementation. Additionally, the trainer's gaze progress or pattern can be stored for future reference as a future guide for students. As one example, the trainee can study the trainer's gaze pattern and then attempt to follow that pattern for future scenarios. In doing so, the trainee can be trained on how to enable a better track or gaze pattern. In some implementations, multiple expert-level gaze patterns can be analyzed and potentially aggregated via machine learning. A model pattern can then be provided to a trainee to study, thereby enabling the trainee to establish or learn better gaze patterns.

Accordingly, the disclosed embodiments facilitate evaluations of images. To do so, the embodiments display an image. The embodiments obtain data corresponding to a gaze fixation of a user who is viewing the image. Based on the gaze fixation, the embodiments identify an image artifact that is represented within the image and that is at a location in the image where the gaze fixation occurred. The embodiments access a recording of an utterance of the user. This recording is recorded during an overlapping time period with when the gaze fixation occurred. The embodiments transcribe the recording into text. In response to parsing the text, the embodiments extract a key term from the parsed text. The embodiments then determine whether the key term corresponds to the image artifact identified based on the gaze fixation.

Example Computer/Computer Systems

Figure 11:
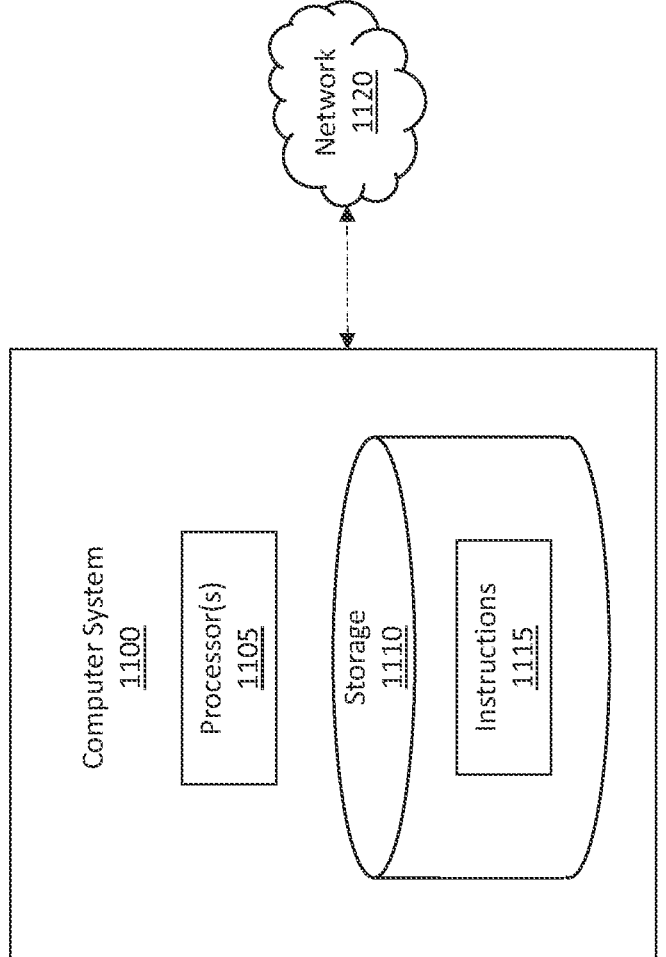
FIG. 11 illustrates an example computer system that can be configured to perform any of the disclosed operations.

Attention will now be directed to FIG. 11 which illustrates an example computer system 1100 that may include and/or be used to perform any of the operations described herein, including the method acts of method 1000. Computer system 1100 may take various different forms. For example, computer system 1100 may be embodied as a tablet, a desktop, a laptop, a mobile device, or a standalone device, such as those described throughout this disclosure. Computer system 1100 may also be a distributed system that includes one or more connected computing components/devices that are in communication with computer system 1100. Computer system 1100 can implement service 105 from FIG. 1.

In its most basic configuration, computer system 1100 includes various different components. FIG. 11 shows that computer system 1100 includes one or more processor(s) 1105 (aka a "hardware processing unit") and storage 1110.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

Storage 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1110 is shown as including executable instructions 1115. The executable instructions 1115 represent instructions that are executable by the processor(s) 1105 of computer system 1100 to perform the disclosed operations, such as those described in the various methods.

The disclosed embodiments may comprise or utilize a special-purpose or general-purpose computer including computer hardware, such as, for example, one or more processors (such as processor(s) 1105) and system memory (such as storage 1110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1120. For example, computer system 1100 can communicate with any number devices or cloud services to obtain or process data. In some cases, network 1120 may itself be a cloud network. Furthermore, computer system 1100 may also be connected through one or more wired or wireless networks to remote/ separate computer systems(s) that are configured to perform any of the processing described with regard to computer system 1100.

A "network," like network 1120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with network 1120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating an evaluation of an image by comparing an identified image artifact included in the image against a gaze fixation that is directed toward the image artifact and against a recording of an utterance that is also associated with the image artifact, said method comprising:
   displaying an image;
   while the image is displayed, tracking a gaze of a user who is viewing the image, wherein tracking the gaze includes identifying a gaze fixation of the user with respect to the image;
   providing an instruction to the user to prompt the user's gaze to follow a specific gaze pattern when the image is displayed, wherein an image artifact is overlapped by the specific gaze pattern;
   determining that the image artifact is represented within the image at a location in the image where the gaze fixation occurred;
   determining whether the user's gaze fixated on the image artifact while the user's gaze followed the specific gaze pattern;
   while the image is displayed, recording an utterance of the user, said utterance being recorded during an overlapping time period with when the gaze fixation occurred;
   transcribing the recorded utterance into text;
   in response to parsing the text, extracting at least one key term from the parsed text; and
   determining whether the at least one key term accurately describes the image artifact where the gaze fixation occurred relative to the image.

2. The method of claim 1, wherein the image is a medical image.

3. The method of claim 1, wherein the gaze fixation of the user occurs in response to the user's gaze residing on the image artifact for at least a threshold time period.

4. The method of claim 3, wherein the threshold time period is at least 500 milliseconds.

5. The method of claim 1, wherein tracking the user's gaze is performed via a wearable gaze detector.

6. The method of claim 1, wherein tracking the user's gaze is performed via a device that is remote relative to the user such that the device is not a wearable device.

7. The method of claim 1, wherein tracking the user's gaze is performed via a headset that renders virtualized content.

8. The method of claim 1, wherein tracking the user's gaze is performed at a sampling rate that is between about 30 Hertz (Hz) and about 120 Hz.

9. The method of claim 1, wherein said method is performed by a handheld device.

10. The method of claim 1, wherein the image artifact is tagged with metadata describing subject matter of the image artifact, wherein determining whether the at least one key term accurately describes the image artifact is performed by comparing the metadata against the at least one key term.

11. The method of claim 1, wherein the image artifact is associated with label data describing subject matter of the image artifact.

12. The method of claim 11, wherein the label data is generated using a machine learning engine.

13. The method of claim 11, wherein the label data is manually provided via user input.

14. A computer system comprising:

one or more processors; and one or more hardware storage devices that store instructions that are executable by the one or more processors to cause the computer system to:

display an image;

while the image is displayed, track a gaze of a user who is viewing the image, wherein tracking the gaze includes identifying a gaze fixation of the user with respect to the image;

provide an instruction to the user to prompt the user's gaze to follow a specific gaze pattern when the image is displayed, wherein an image artifact is overlapped by the specific gaze pattern;

determine that the image artifact is represented within the image at a location in the image where the gaze fixation occurred;

determine whether the user's gaze fixated on the image artifact while the user's gaze followed the specific gaze pattern;

while the image is displayed, record an utterance of the user, said utterance being recorded during an overlapping time period with when the gaze fixation occurred;

transcribe the recorded utterance into text;

in response to parsing the text, extract a key term from the parsed text; and determine whether the key term corresponds to the image artifact, which is identified based on the gaze fixation.

15. The computer system of claim 14, wherein at least one of a visual cue or an audio cue is provided to the user while the user's gaze is being tracked.

16. The computer system of claim 14, wherein touch input is further received, and wherein the touch input, the key term, and data for the gaze fixation is used to determine whether the image artifact is accurately being described.

17. A method comprising:

displaying an image;

obtaining data corresponding to a gaze fixation of a user who is viewing the image;

providing an instruction to the user to prompt a gaze of the user to follow a specific gaze pattern when the image is displayed, wherein an image artifact is overlapped by the specific gaze pattern;

determining that the image artifact is represented within the image and that the image artifact is at a location in the image where the gaze fixation occurred;

determining whether the user's gaze fixated on the image artifact while the user's gaze followed the specific pattern;

accessing a recording of an utterance of the user, said recording being recorded during an overlapping time period with when the gaze fixation occurred;

transcribing the recording into text;

in response to parsing the text, extracting a key term from the parsed text; and determining whether the key term corresponds to the image artifact identified based on the gaze fixation.

18. The method of claim 17, wherein the method further includes providing a second instruction to prompt the user to look at a second image artifact.

19. The method of claim 18, wherein the method further includes determining that the user's gaze fixated on the second image artifact.

20. The method of claim 19, wherein the method further includes at least one of: providing an audio respond stating that the user successfully fixated on the second image artifact or providing a visual alert stating that the user successfully fixated on the second image artifact.

* * * * *